(12) United States Patent
Balasubramanian

(10) Patent No.: US 8,826,237 B2
(45) Date of Patent: *Sep. 2, 2014

(54) GUIDING CORRECTION OF SEMANTIC ERRORS IN CODE USING COLLABORATION RECORDS

(71) Applicant: International Business Machines Corporation, Armonk, NY (US)

(72) Inventor: Swaminathan Balasubramanian, Troy, MI (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/182,684

(22) Filed: Feb. 18, 2014

(65) Prior Publication Data

US 2014/0165028 A1 Jun. 12, 2014

Related U.S. Application Data

(63) Continuation of application No. 12/195,362, filed on Aug. 20, 2008, now Pat. No. 8,713,534.

(51) Int. Cl.
*G06F 9/44* (2006.01)

(52) U.S. Cl.
USPC .......................................................... 717/125

(58) Field of Classification Search
USPC .......................................................... 717/125
See application file for complete search history.

(56) References Cited

U.S. PATENT DOCUMENTS

| | | | |
|---|---|---|---|
| 6,381,506 B1 | 4/2002 | Grappone | |
| 7,607,066 B2 | 10/2009 | Gertz et al. | |
| 8,266,594 B2 | 9/2012 | Balasubramanian | |
| 8,312,427 B2 | 11/2012 | Hutchison et al. | |
| 2004/0003335 A1 | 1/2004 | Gertz et al. | |
| 2004/0078785 A1 | 4/2004 | Dutt et al. | |
| 2004/0123186 A1 | 6/2004 | Kulp et al. | |
| 2005/0097508 A1 | 5/2005 | Jacovi et al. | |
| 2006/0085245 A1 | 4/2006 | Takatsuka et al. | |
| 2006/0136876 A1 | 6/2006 | Melamed et al. | |
| 2006/0161819 A1 | 7/2006 | Nissan-Messing et al. | |
| 2007/0055656 A1 | 3/2007 | Tunstall-Pedoe | |
| 2007/0168935 A1 | 7/2007 | Ogami et al. | |
| 2007/0168946 A1 | 7/2007 | Drissi et al. | |
| 2008/0270989 A1 | 10/2008 | Ahadian et al. | |

(Continued)

OTHER PUBLICATIONS

U.S. Appl. No. 12/195,362—Non-Final Office Action Mailed Nov. 28, 2011.

(Continued)

*Primary Examiner* — Li B Zhen
*Assistant Examiner* — Bradford Wheaton
(74) *Attorney, Agent, or Firm* — John R. Pivnichny; Law Office of Jim Boice

(57) ABSTRACT

A method, system and program product for guiding correction of semantic errors in code in an integrated development environment. The method includes inputting, using a code editor, code being developed by a developer in an integrated development environment, identifying, using one or more collaboration records located for a node in a syntax tree constructed for the code inputted, any semantic errors pertaining to use of a third-party library in the code inputted by the developer and, displaying one or more suggestions associated with the one or more collaboration records located to correct the any semantic errors identified for the node, wherein the developer can choose a suggestion of the one or more suggestions displayed to guide correction of the any semantic errors.

17 Claims, 5 Drawing Sheets

(56) References Cited

U.S. PATENT DOCUMENTS

| | | |
|---|---|---|
| 2009/0328004 A1 | 12/2009 | Balasubramanian |
| 2010/0050154 A1 | 2/2010 | Balasubramanian |
| 2010/0050160 A1 | 2/2010 | Balasubramanian |
| 2012/0240101 A1 | 9/2012 | Balasubramanian |

OTHER PUBLICATIONS

U.S. Appl. No. 12/195,368—Non-Final Office Action Mailed Dec. 7, 2011.
U.S. Appl. No. 12/195,368—Notice of Allowance Mailed May 7, 2012.
U.S. Appl. No. 12/195,362—Non-Final Office Action Mailed Jun. 28, 2012.
U.S. Appl. No. 12/195,373—Non-Final Office Action Mailed Sep. 17, 2012.
McCarey, et al., "Rascal: A Recommender Agent for Agile Reuse," 2005, Artificial Intelligence Review, pp. 253-276.
U.S. Appl. No. 12/195,362—Final Office Action Mailed Feb. 28, 2013.
U.S. Appl. No. 12/195,373—Final Office Action Mailed Oct. 25, 2013.
U.S. Appl. No. 13/486,567—Non-Final Office Action Mailed Jun. 10, 2013.

GUIDING CORRECTION OF SEMANTIC ERRORS IN CODE USING COLLABORATION RECORDS

The present application is a continuation of U.S. patent application Ser. No. 12/195,362, filed on Aug. 20, 2008, and entitled, "System, Method and Program Product for Guiding Correction of Semantic Errors in Code Using Collaboration Records," which is incorporated herein by reference.

BACKGROUND

The present invention relates to computer systems and software, and more specifically to an automated technique for guiding correction of semantic errors in code using collaboration records in an integrated development environment (IDE).

Most application development activities are managed within an Integrated Development Environment (IDE). Errors in code can be related to syntax, or can also be related to semantics. Code semantic errors can further be related to language semantics, where the code violates the semantics of the underlying language, or semantics related to the use of a third party library. Typically, an IDE provides an editor that is configured to validate code syntax, highlight syntactic errors in a particular language and is configured to offer appropriate corrections for any syntax errors. When the editor identifies a syntax error, matching records are displayed to offer corrections. Often, an IDE provides a rules engine used to highlight language semantic errors, which can be difficult to identify and to correct. As such, there is a need for an application developer to find ways to effectively monitor and correct such semantic errors during development of software.

SUMMARY

In a first aspect, the invention provides a method for guiding correction of semantic errors in code in an integrated development environment (IDE). The method includes inputting, using a code editor, code being developed by a developer in an integrated development environment, identifying, using one or more collaboration records located for a node in a syntax tree constructed for the code inputted, any semantic errors pertaining to use of a third-party library in the code inputted by the developer and displaying one or more suggestions associated with the one or more collaboration records located to correct the any semantic errors identified for the node, where the developer can choose a suggestion of the one or more suggestions displayed to guide correction of the any semantic errors. In an embodiment, the identifying step includes providing a collaboration datastore for storing one or more collaboration records containing respective invocations for identifying the node, where a collaboration record includes one or more properties and, where a respective invocation of the respective invocations includes a type of invocation and one or more parameters. In an embodiment, the identifying step further includes constructing, using a code parser, a syntax tree representation of the code inputted. Further, in an embodiment, the identifying step includes creating semantic error markers within the code editor for the any semantic errors identified using the one or more collaboration records located. In an embodiment, the displaying step further includes ascertaining whether or not the developer wishes to apply a suggestion of the one or more suggestions displayed for the node and, if the developer wishes to apply the suggestion of the one or more suggestions displayed for the node, applying the suggestion to the node to guide correction of the any semantic errors identified. In an embodiment, the displaying step further includes inquiring whether or not the developer wishes to contribute feedback with respect to the one or more suggestions displayed for the node and, if the developer wishes to contribute the feedback pertaining to the one or more suggestions displayed, receiving the feedback for updating the one or more suggestions displayed. In an embodiment, the displaying step further includes inquiring whether or not the developer wishes to add a new suggestion to a respective invocation within a collaboration record of the one or more collaboration records located and, if the developer wishes to add the new suggestion to the respective invocation within the collaboration record of the one or more collaboration records located, receiving the new suggestion for updating the respective invocation associated with the collaboration record of the one or more collaboration records located.

In another aspect the invention provides a computer system for guiding correction of semantic errors in code in an integrated development environment. The computer system includes a central processing unit, first program instructions to input code being developed by a developer in an integrated development environment, the first program instructions including instructions to construct, using a code parser, a syntax tree representation of the code inputted. Further, the computer program product includes second program instructions to identify, using one or more matching collaboration records located for a node in a syntax tree constructed for the code inputted, any semantic errors pertaining to use of a third-party library in the code inputted and third program instructions to display one or more suggestions associated with the one or more matching collaboration records located to correct the any semantic errors identified for the node, where the developer can choose a suggestion of the one or more suggestions displayed to guide correction of the any semantic errors. In an embodiment, the second program instructions include instructions to provide a collaboration datastore for storing one or more collaboration records containing respective invocations for identifying the node, where a collaboration record includes one or more properties and where a respective invocation of the respective invocations includes a type of invocation and one or more parameters. In an embodiment, the second program instructions include instructions to create semantic error markers within a code editor for the any semantic errors identified using the one or more collaboration records located. In an embodiment, the third program instructions include instructions to ascertain whether or not the developer wishes to apply a suggestion of the one or more suggestions displayed for the node and, if the developer wishes to apply the suggestion of the one or more suggestions displayed for the node, the third instructions include instructions to apply the suggestion to the node to guide correction of the any semantic errors identified. In an embodiment, the third program instructions include instructions to inquire whether or not the developer wishes to contribute feedback with respect to the one or more suggestions displayed for the node and, if the developer wishes to contribute the feedback pertaining to the one or more suggestions displayed for the node, receiving the feedback for updating the one or more suggestions displayed for the node. In an embodiment, the third program instructions include instructions to inquire whether or not the developer wishes to add a new suggestion to a respective invocation within a collaboration record of the one or more collaboration records located and, if the developer wishes to add the new suggestion to the respective invocation within the collaboration record of the one or more collaboration records located, receiving the new suggestion for updating the respective invocation associated with the collaboration record of the one or more collaboration records located. In an embodiment, each of the first, second and third program instructions are stored in the computer system for execution by the central processing unit.

In yet another aspect, the invention provides a computer program product for guiding correction of semantic errors in code in an integrated development environment. The computer program product is stored on a computer readable medium and includes first program instructions to input code being developed by a developer in an integrated development environment, the first program instructions including instructions to construct, using a code parser, a syntax tree representation of the code inputted, second program instructions to identify, using one or more matching collaboration records located for a node in a syntax tree constructed for the code inputted, any semantic errors pertaining to use of a third-party library in the code inputted. Further, the computer program product includes third program instructions to display one or more suggestions associated with the one or more collaboration records located to correct the any semantic errors identified for the node, where the developer can choose a suggestion of the one or more suggestions displayed to guide correction of the any semantic errors identified. In an embodiment, the computer program product further includes fourth program instructions to execute the code inputted, the fourth program instructions including instructions to ascertain whether or not the developer wishes to apply a suggestion of the one or more suggestions displayed for the node and, if the developer wishes to apply the suggestion of the one or more suggestions displayed for the node, the fourth program instructions including instructions to apply the suggestion to the node to guide correction of the any semantic errors identified before executing the code. In an embodiment, the second program instructions include instructions to provide a collaboration datastore for storing one or more collaboration records containing respective invocations for identifying the node, where a collaboration record includes one or more properties, where a respective invocation of the respective invocations includes a type of invocation and one or more parameters and, where the second program instructions include instructions to create semantic error markers within a code editor for the any semantic errors identified using the one or more matching collaboration records located. In an embodiment, the second program instructions include instructions to ascertain whether or not the developer wishes to apply a suggestion of the one or more suggestions displayed for the node and, if the developer wishes to apply the suggestion of the one or more suggestions displayed for the node, the second instructions include instructions to apply the suggestion to the node to guide correction of the any semantic errors identified. In an embodiment, the third program instructions include instructions to inquire whether or not the developer wishes to contribute feedback with respect to the one or more suggestions displayed for the node and, if the developer wishes to contribute the feedback pertaining to the one or more suggestions displayed for the node, receiving the feedback for updating the one or more suggestions displayed for the node. In an embodiment, the third program instructions include instructions to inquire whether or not the developer wishes to add a new suggestion to a respective invocation within a collaboration record of the one or more collaboration records located and, if the developer wishes to add the new suggestion to the respective invocation within the collaboration record of the one or more collaboration records located, receiving the new suggestion for updating the respective invocation associated with the collaboration record of the one or more collaboration records located. In an embodiment, each of the first, second, third and fourth program instructions are recorded on the computer readable medium.

Further, in yet another aspect, the invention provides a process for deploying computing infrastructure includes integrating computer-readable code into a computing system, where the code in combination with the computing system is capable of performing a process of guiding correction of semantic errors in code in an integrated development environment. The process includes inputting, using a code editor, code being developed by a developer in an integrated development environment, constructing, using a code parser, a syntax tree representation of the code inputted, identifying, using one or more collaboration records located for a node in the syntax tree constructed for the code inputted, any semantic errors pertaining to use of a third-party library in the code inputted by the developer and displaying one or more suggestions associated with the one or more collaboration records located to correct the any semantic errors identified for the node, where the developer can choose a suggestion of the one or more suggestions displayed to guide correction of the any semantic errors. In an embodiment, the process further includes providing a collaboration datastore for storing one or more collaboration records containing respective invocations for identifying the node, where a collaboration record includes one or more properties and where a respective invocation of the respective invocations includes a type of invocation and one or more parameters. In an embodiment, the process further includes creating semantic error markers within the code editor located for the any semantic errors identified using the one or more collaboration records located. In an embodiment, the displaying step further includes ascertaining whether or not the developer wishes to apply a suggestion of the one or more suggestions displayed for the node and, if the developer wishes to apply the suggestion of the one or more suggestions displayed for the node, applying the suggestion to the node to guide correction of the any semantic errors identified. In an embodiment, the displaying step further includes inquiring whether or not the developer wishes to contribute feedback with respect to the one or more suggestions displayed for the node and, if the developer wishes to contribute the feedback pertaining to the one or more suggestions displayed, receiving the feedback for updating the one or more suggestions displayed. In an embodiment, the displaying step further includes inquiring whether or not the developer wishes to add a new suggestion to a respective invocation within a collaboration record of the one or more collaboration records located and, if the developer wishes to add the new suggestion to the respective invocation within the collaboration record of the one or more collaboration records located, receiving the new suggestion for updating the respective invocation associated with the collaboration record of the one or more collaboration records located.

BRIEF DESCRIPTION OF THE SEVERAL VIEWS OF THE DRAWINGS

The accompanying drawings, which are incorporated in and form a part of this specification, illustrate embodiments of the invention and, together with the description, serve to explain the principles of the invention.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

Many of the functional units described in this specification have been referred to as modules or components, in order to more particularly emphasize their implementation independence. A module may be implemented in programmable hardware devices such as field programmable gate arrays, programmable array logic, programmable logic devices or the like. Modules may also be implemented in software for execution by various types of processors. An identified module or component of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and over disparate memory devices. Furthermore, modules may also be implemented as a combination of software and one or more hardware devices. For instance, a module may be embodied in the combination of a software executable code stored on a memory device. In a further example, a module may be the combination of a processor that operates on a set of operational data.

Figure 1:
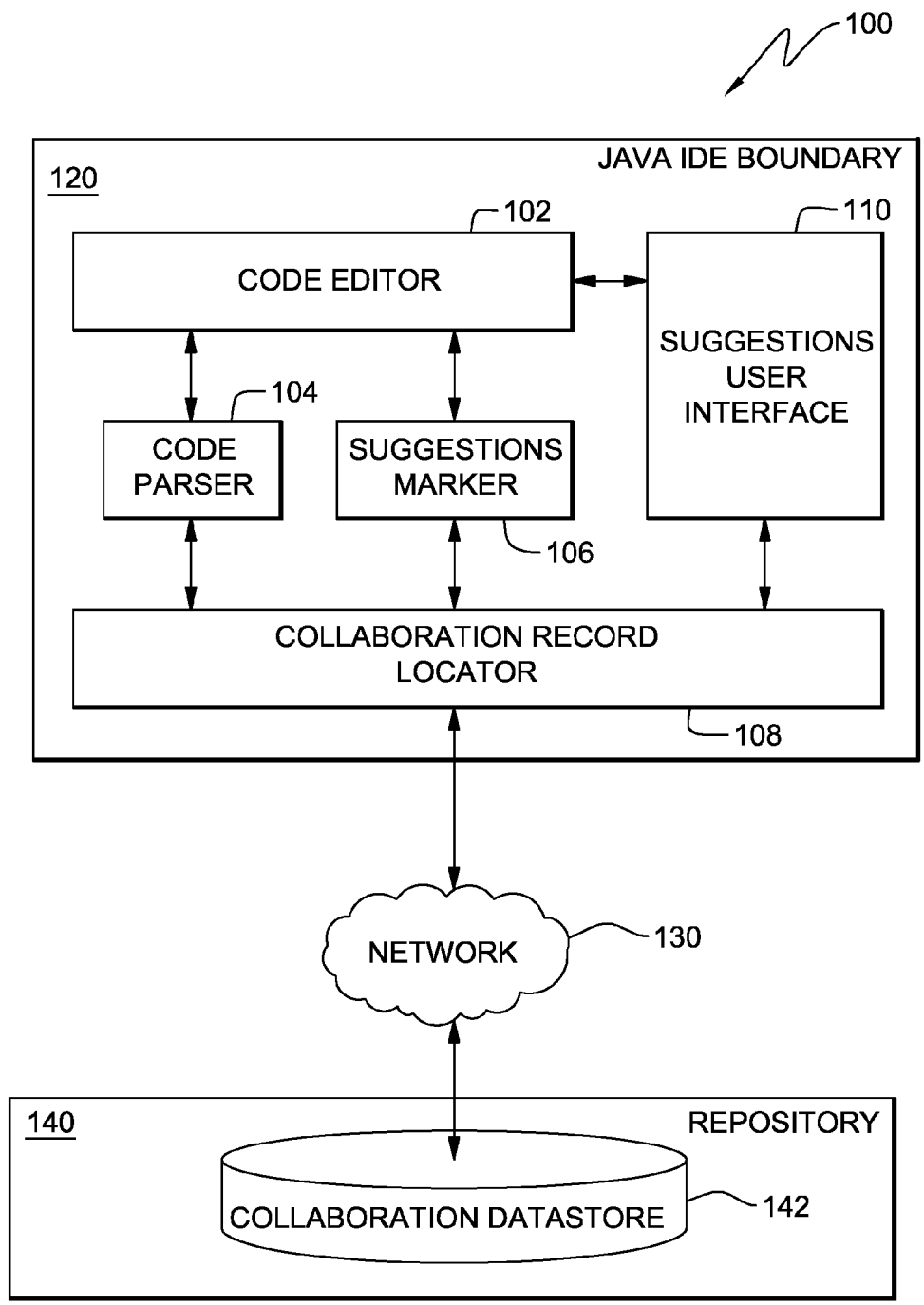
FIG. 1 is a schematic block diagram of a Java integrated development environment (IDE) for guiding correction of semantic errors identified in code, using collaboration records, in accordance with an embodiment of the present invention.

Reference is now made to FIG. 1, which illustrates an embodiment of a computer infrastructure 100 for guiding corrections of semantic errors in code in an integrated development environment (IDE), using collaboration records, in accordance with an embodiment of the invention. Turning to FIG. 1, FIG. 1 depicts a schematic block system diagram illustrating one embodiment of a computer infrastructure 100, which illustrates an integrated development environment (IDE) for guiding correction of semantic errors due to use of third party libraries in code being developed, using collaboration records. In an embodiment, the integrated development environment (IDE) boundary 120 comprises an IDE software application that comprises one or more program modules or program components for guiding correction of semantic errors in code being developed, using collaboration records. In an embodiment, shown in FIG. 1, the integrated development environment (IDE) 120 includes one or more code editor components 102 that an application developer may use to write code in a specific programming language. Besides providing a convenient interface to view and modify code, a code editor is able to validate code syntax, highlight syntactic errors and offer corrections. In an embodiment, as shown in FIG. 1, the integrated development environment (IDE) boundary 120 comprises a Java integrated development environment (IDE) 120 for guiding correction of semantic errors in Java code being developed, using collaboration records for the Java programming language. A semantic error occurs when code violates the semantics of the underlying language or violates use of a third-party library. As depicted in FIG. 1, the Java integrated development environment (IDE) boundary 120 includes a code editor component 102 (simply referred to herein after as "code editor"), a code parser component 104 (simply referred to herein after as "code parser"), a suggestions marker component 106 (simply referred to herein after as "suggestions marker"), a suggestions user interface component 110 (simply referred to herein after as "suggestions user interface") and a collaboration record locator component 108 (simply referred to herein after as "collaboration record locator"). The code editor 102 is used by a programmer or developer to input or enter code. As a developer enters code into the code editor 102, the code parser 104 reads and parses the entered code. Further, the code parser 104 constructs an Abstract Syntax Tree (AST) representation of the code inputted in the code editor 102. The collaboration record locator 108 uses the AST constructed to locate one or more collaboration records stored or maintained in a collaboration datastore 142 within a repository 140. In an embodiment, the collaboration datastore 142 is located in a remote repository 140 and is accessed over a network 130. However, it is understood that the collaboration datastore 142 may be located in a local repository within integrated development environment (IDE) 120, where each developer may have access to their own local datastore, and where a plurality of local datastores may be configured to update each other via replication. Further, in an embodiment, the collaboration record locator 108 returns the collaboration records retrieved from the collaboration datastore 142 to the suggestions marker 106. The suggestions marker 106 creates semantic error markers with the code editor 102 using the collaboration records retrieved by the collaboration record locator 108. The system 100 includes a Java integrated development environment (IDE) boundary 120, which is intended to represent any type of computer architecture that is maintained in a secure environment (i.e., for which access control is enforced). It should be understood, however, that although not shown, other hardware and software components (e.g., compiler, debugger, additional computer systems, routers, firewalls, etc.) could be included in system 100. However, it is understood by one skilled in the art that the invention may be used in conjunction with other programming languages for guiding correction of semantic errors in code due to use of third party libraries.

Figure 2:
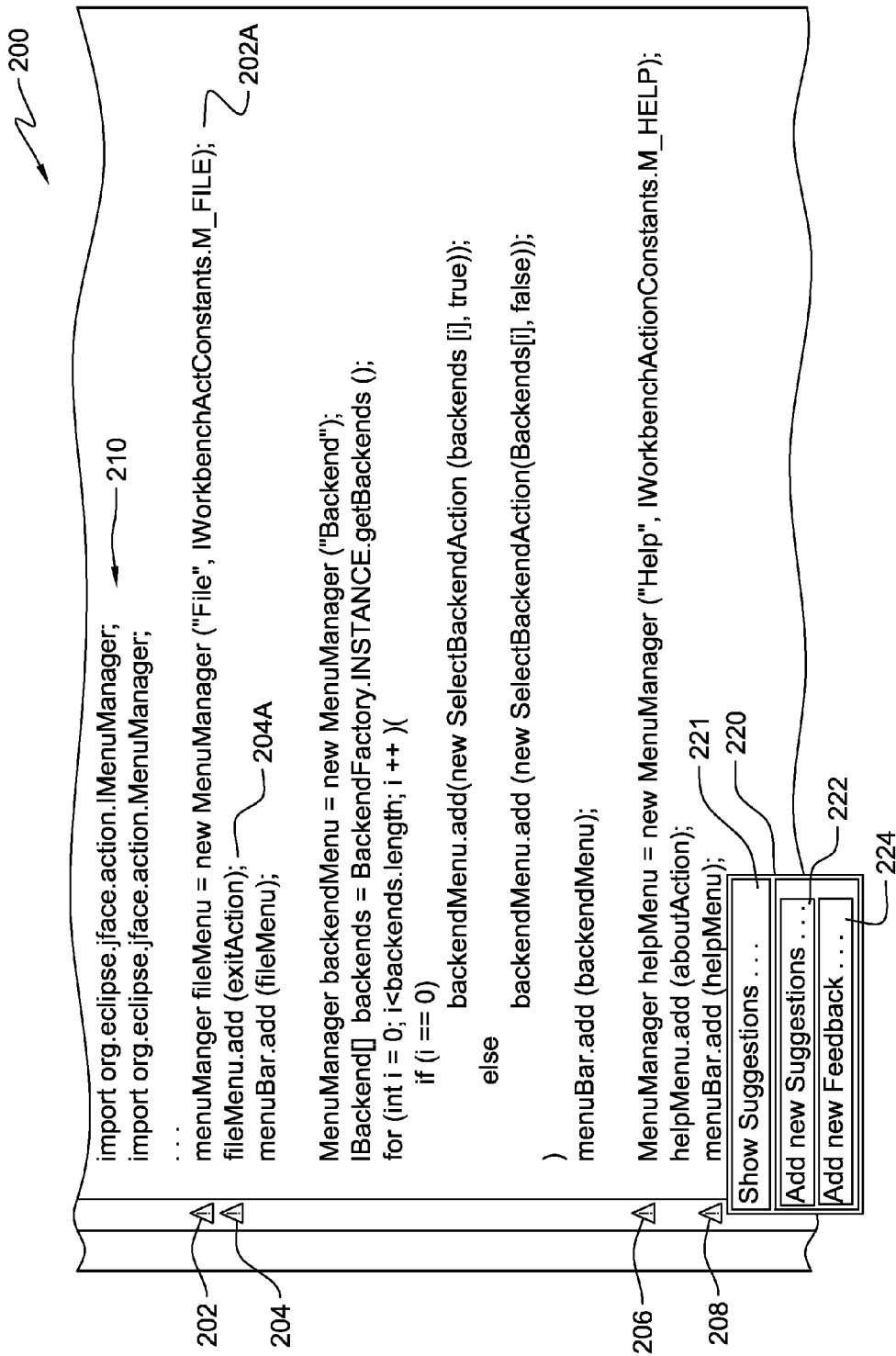
FIG. 2 depicts an illustration of an example of a Java integrated development environment (IDE) for guiding correction of semantic errors identified in code, using collaboration records, in accordance with an embodiment of the present invention.

Reference is now made to FIG. 2, reference numeral 200, which illustrates a section of code under development in a code editor of an integrated development environment (IDE) that is configured to guide correction of semantic errors identified in the code under development, in accordance with an embodiment of the invention. As shown in FIG. 2, a developer has entered or inputted lines of code into a code editor, for instance, Java code inputted into a Java code editor. The code uses a number of third-party library classes (reference numeral 210), shown in FIG. 2. In particular, the code in FIG. 2 shows two third-party libraries, reference numeral 210, namely, 'org.eclipse.jface.action.IMenuManager' and 'org.eclipse.jface.action.MenuManager' The code editor has identified four semantic errors (reference numerals 202, 204, 206 and 208) relating to the usage of third-party library classes 210. In particular, reference numeral 202A shows the line of code where semantic error 202 has occurred, whereas, reference numeral 204A shows the line of code where semantic error 204 has occurred. As shown in FIG. 2, there are no syntactic or language semantic errors identified for the code entered into the code editor. In the code editor, the developer may select or choose any of the four semantic errors identified by the code editor. In the example shown in FIG. 2, the developer has right-clicked on the icon for the semantic error 208, which leads to the display of a pop-up context menu 220 from which the developer can further select options. In particular, as shown, the pop-up context menu 220 pertaining to semantic error 208 presents three options to the developer. The first option (reference numeral 221) is to "show suggestions" to the developer for guiding correction of the semantic error 208. In particular, the code editor provides guidance to the developer by showing suggestions from peer developers for guiding correction of the error. The second option (reference numeral 222) in the pop-up context menu 220 provides the developer the option "add new suggestions". In particular, if the developer does not see a particular suggestion in the "show suggestions" option, or the developer does not agree with the suggestions offered by peer developers and has found an alternate way to correct the error, then the developer can add or contribute a new suggestion for guiding correction of the semantic error found in the code entered in the code editor. Further, the third option (reference numeral 224) in the pop-up context menu 220 provides the developer the option to "add new feedback" to a suggestion for the semantic error 208 chosen by the developer, wherein the developer can enter into discussions with peer developers by selecting the option to contribute or add new feedback. In an embodiment, the semantic errors 202, 204, 206 and 208 are identified using collaboration records. In an embodiment, a collaboration record is a container for discussions relating to the usage of a third-party library component or class. The component or class type depends on the programming language. As mentioned herein above, the programming language used in the example comprises an object oriented programming language, namely, the Java programming language. In an embodiment, a collaboration record is maintained for every Java class within the third-party library. Further, multiple records may be maintained for multiple versions of the same Java class. Furthermore, in an embodiment, a collaboration record comprises one or more invocations. An invocation my comprise one of: initialization or object construction, method invocation or externalized or public member variable. Further, an invocation may contain zero or more suggestion records that contain usage guidance submitted by developers. Each suggestion record may contain zero or more feedback records submitted by peer developers.

Figure 3:
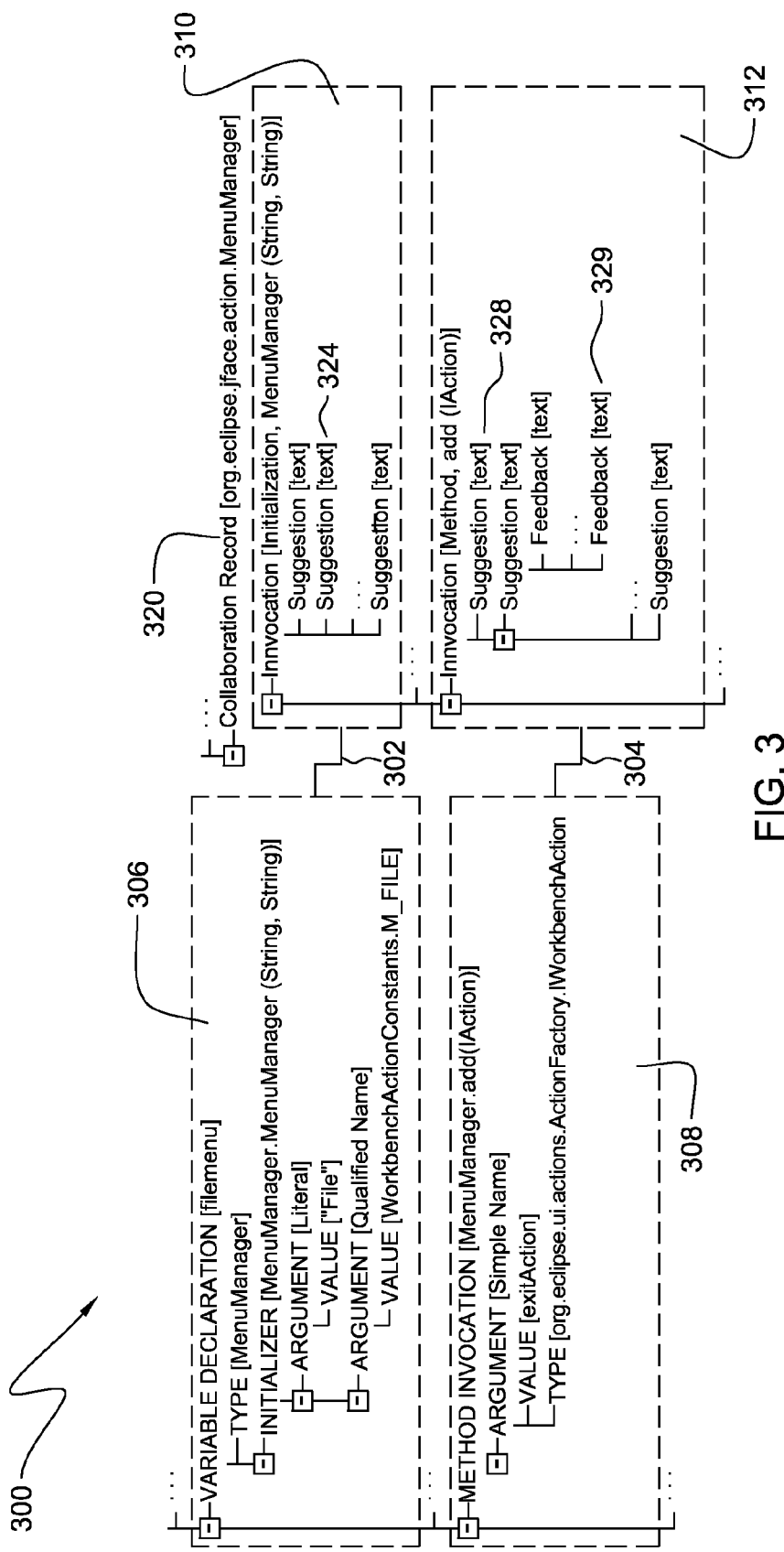
FIG. 3 depicts an illustration of the mapping between a node in the Abstract Syntax Tree (AST) created for the code inputted into a code editor, as shown in FIG. 2, and one or more collaboration records located, in accordance with an embodiment of the present invention.

Reference is now made to FIG. 3, reference numeral 300, which illustrates a mapping between the code inputted by a developer into the code editor and one or more collaboration records located for a semantic error within the code. In an embodiment, the code inputted into the code editor is represented using an Abstract Syntax Tree (AST). As shown in FIG. 3, reference numeral 302 and 304 illustrate how respective semantic errors 202 and 204 (in FIG. 2) found in respective lines of code 202A and 204A (in FIG. 2) in the code editor 200 are mapped to respective invocations 310 and 312 within a collaboration record 320. In FIG. 3, reference numeral 306 represents the Abstract Syntax Tree (AST) representation of the line of code 202A (shown in FIG. 2). Similarly, reference numeral 308 represents the Abstract Syntax Tree (AST) representation of the line of code 204A (shown in FIG. 2). Further, FIG. 3 shows respective invocations 310 and 312 for the third-party library class 'org.eclipse.jface.action.MenuManager' used in the developer code. Further, FIG. 3 shows semantic error 202 (in FIG. 2) is mapped via a mapping 302 to the invocation (reference numeral 310), which comprises an initialization or object construction, whereas, semantic error 204 (in FIG. 2) is mapped via mapping 304 to an invocation (reference numeral 312), which comprises a method invocation. Further, the invocation 310 within collaboration record 320 contains one or more suggestion records (reference numeral 324) that contain usage guidance submitted by peer developers. Similarly, the invocation 312 within collaboration record 320 contains one or more suggestion records (reference numeral 328), which further contain feedback records (reference numeral 329) submitted by peer developers. It is understood by one skilled in the art that other internal representations of the code besides an Abstract Syntax Tree (AST) may be used for mapping of the code and the collaboration records.

Figure 4:
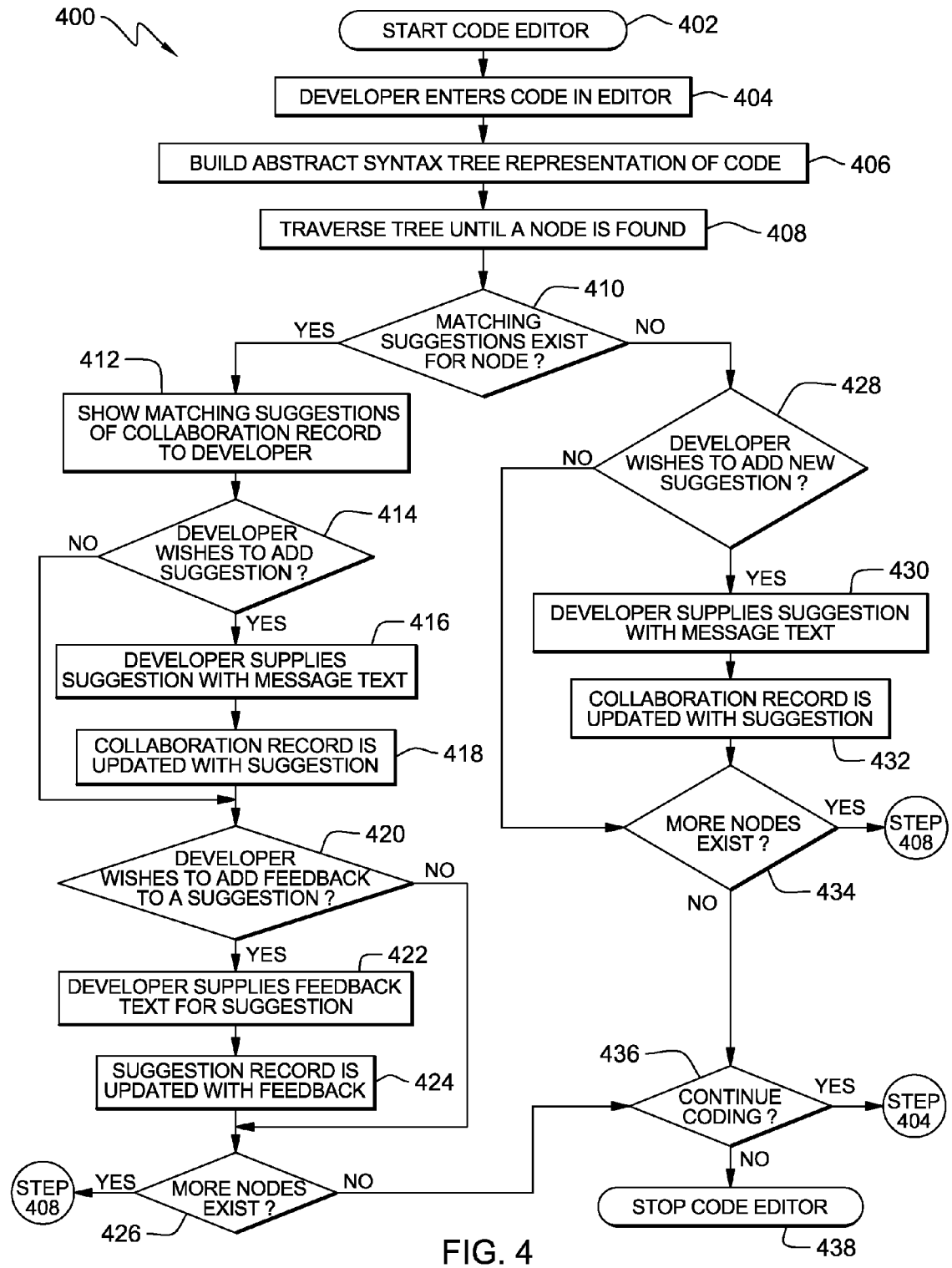
FIG. 4 depicts a flowchart outlining the steps performed for guiding correction of semantic errors in code, using collaboration records, in accordance with an embodiment of the present invention.

In another embodiment, the invention provides a method for guiding correction of semantic errors in an integrated development environment (IDE) using collaboration records, in accordance with an embodiment of the present invention. Reference is now made to FIG. 4, which depict a flowchart 400 outlining the method of guiding correction of semantic errors in code in an integrated development environment (IDE), using collaboration records. The method begins with starting the code editor in step 402. The developer enters code in the code editor in the integrated development environment (IDE) in step 404. In step 406, the code parser builds an abstract syntax tree representation of the code and in step 408 the code parser traverses the abstract syntax tree until a node with a semantic error is found. Once the AST for the code is built, each node that has semantic errors will have one matching invocation within one matching collaboration record. Further, in step 410, using the AST constructed, the code editor utilizes the collaboration record locator to determine whether or not one or more collaboration records with matching invocations containing matching suggestions are located or exist for the node. In an embodiment, an invocation within a collaboration record contains properties used to identify the node. In an embodiment, a collaboration record includes one or more properties for identifying the node. For instance, the one or more properties may include properties, such as, a package name, a class name and/or a class version number. Furthermore, a respective invocation within a collaboration record may include a type of invocation and one or more parameters. If a matching suggestion exists for the node, then the code editor uses the collaboration record locator to locate matching suggestions pertaining to collaboration records, which are then displayed in step 412 to the developer using the suggestions user interface. In an embodiment, only after the matching suggestions have already been determined by the collaboration record locator, all suggestions associated with that one invocation will be displayed to the developer via the suggestions user interface. Further, in step 414, the code editor via the suggestions user interface prompts a developer as to whether or not the developer wishes to add a suggestion to the specific invocation or parent invocation of the collaboration record located for the node. If the developer wishes to add a suggestion, the developer enters the suggestion using message text in the code editor in step 416. The code editor within the integrated development environment (IDE) updates in step 418 the collaboration record maintained in the collaboration datastore with the suggestion entered by the developer in step 416. If the developer does not wish to add a suggestion in step 414, then the code editor via the suggestions user interface prompts the developer in step 420 to determine whether or not the developer wishes to add feedback text to an existing suggestion. If the developer does not wish to add feedback to an existing suggestion, then the process continues with step 426, where the code editor determines whether or not more nodes containing semantic errors exist. If more nodes exist in step 426, then the code editor goes back to step 408 and repeats the steps described herein above, and if no further nodes exist, then the code editor proceeds to step 436, as described herein below. On the other hand, if in step 420, the developer wishes to add feedback to an existing suggestion, the developer enters the feedback text for the suggestion into the code editor in step 422. The code editor within the integrated development environment (IDE) updates in step 424 the suggestion record for a collaboration record maintained in the collaboration datastore with the additional feedback entered for the suggestion by the developer in step 422. Further, in step 426, the code editor within the integrated development environment (IDE) application determines whether or not more nodes containing additional semantic errors exist. If more nodes containing semantic errors are found to exist, the process returns to step 408, where the code editor traverses the AST tree constructed by the code parser until another node containing a semantic error is found. However, if the code editor determines in step 426 that additional nodes containing semantic errors do not exist, then the code editor determines in step 436 whether or not the developer wishes to continue coding. If the developer wishes to continue coding, the process returns to step 404, where the developer enters additional code into the code editor. However, if in step 436, the developer does not wish to continue coding, execution of the code editor is stopped in step 438. Going back to step 410, if the code editor determines that a matching suggestion does not exist for the node, then the code editor determines in step 428 whether or not the developer wishes to add a new suggestion. If the developer wishes to add a new suggestion to the parent invocation within a collaboration record, then the developer enters or supplies the suggestion in step 430 by entering message text into the code editor. Further, the code editor updates in step 432 the collaboration record maintained in the collaboration datastore with the suggestion. If in step 428, the developer does not wish to add a new suggestion, or after the code editor updates the collaboration record in step 432, in step 434, the code editor within the integrated development environment (IDE) application determines whether or not more nodes containing additional semantic errors exist. If more nodes containing semantic errors are found to exist, the process returns to step 408, where the code editor traverses the AST tree until a node containing a semantic error is found. However, if the code editor determines in step 434 that additional nodes containing semantic errors do not exist, then the code editor determines in step 436 whether or not the developer wishes to continue coding. If the developer wishes to continue coding, the process returns to step 404, where the developer enters additional code into the code editor. However, if in step 436, the developer does not wish to continue coding, execution of the code editor is stopped in step 438.

Figure 5:
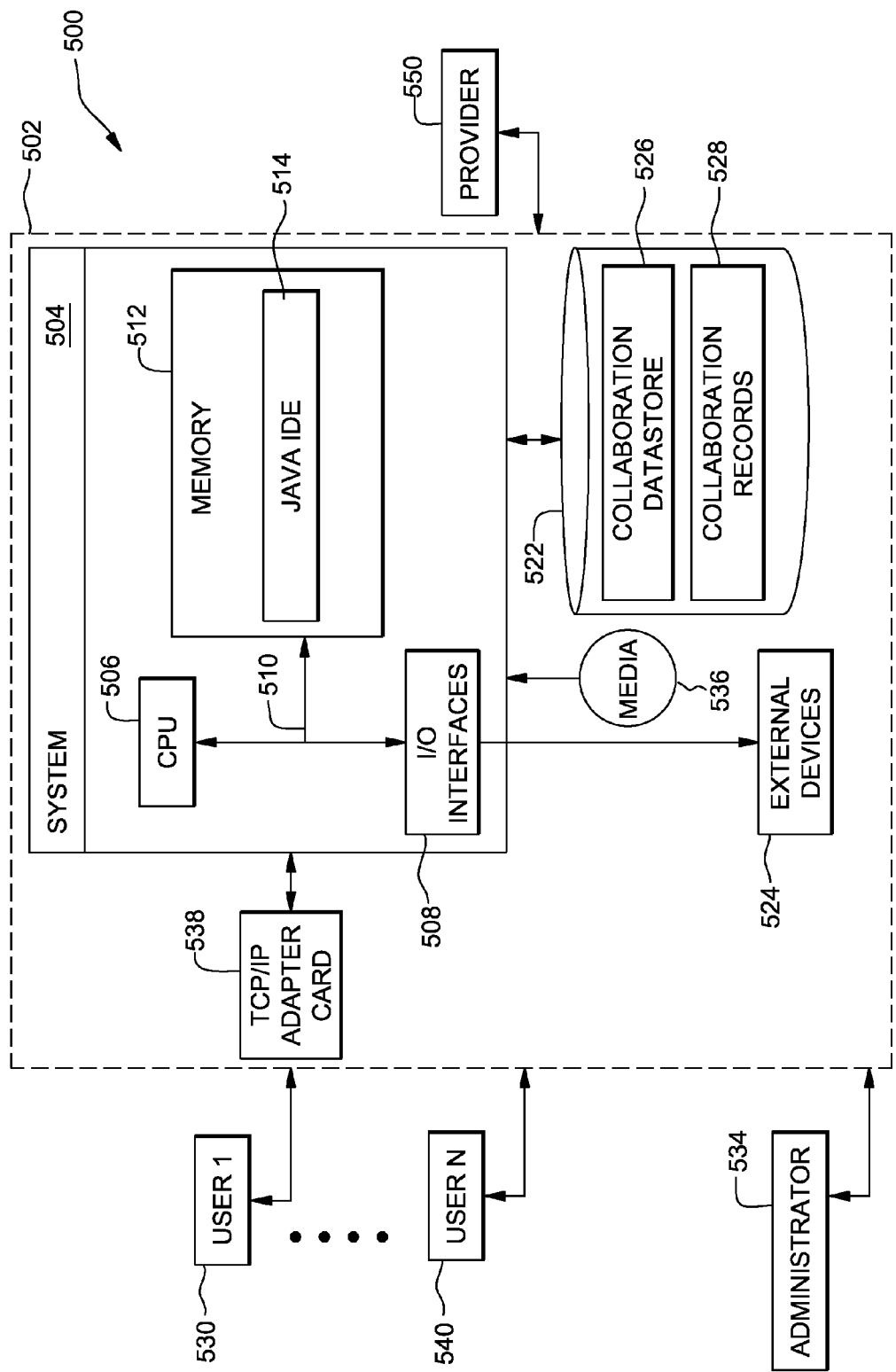
FIG. 5 is a schematic block system diagram of an integrated development environment (IDE), such as, a Java IDE for guiding correction of semantic errors in code, using collaboration records, in accordance with an embodiment of the present invention.

Referring now to FIG. 5, there is illustrated a computer system 500 that includes a computer infrastructure 502 having a computer program product configured to guide correction of semantic errors identified in a section of code under development, in accordance with an embodiment of the invention. The computer program product comprises a computer readable or computer-usable storage medium, which provides program code, such as, the Java integrated development environment (IDE) application 514 for guiding correction of semantic errors identified in a section of Java code under development. The Java integrated development environment (IDE) application 514 can be loaded into computer system 504 from a type of computer readable media 536, such as, a magnetic tape or disk, optical media, DVD, memory stick, semiconductor memory, etc. or downloaded from the Internet via a TCP/IP adapter card 538. As depicted in FIG. 5, system 500 includes a computer infrastructure 502, which is intended to represent any type of computer architecture that is maintained in a secure environment (i.e., for which access control is enforced). As shown, infrastructure 502 includes a computer system 504 that typically represents an application server or system 504 or the like that includes a integrated development environment (IDE) for developing software, such as the Java integrated development environment (IDE) 514 configured to guide correction of semantic errors in code under development. It should be understood, however, that although not shown, other hardware and software components (e.g., additional computer systems, routers, firewalls, etc.) could be included in infrastructure 502.

In general, user 1 (reference numeral 530) through user N (reference numeral 540) may access the computer system 504, which has deployed thereon the Java integrated development environment (IDE) application 514, which implements the invention. As shown in FIG. 5, the system 504 (which has implemented thereon the Java integrated development environment (IDE) application 514) is shown to include a storage system or repository 522. In an embodiment, the storage system 522, stores a collaboration datastore 526 that has stored therein one or more collaboration records 528 used for guiding correction of semantic errors in code under development. In particular, a developer or programmer (user 1, reference numeral 530 through user N, reference numeral 540) accesses the Java integrated development environment (IDE) application 514 running on system 504 over a network via interfaces (e.g., web browsers) loaded on a client, for example, a personal computer, a laptop, a handheld device, etc. In the case of the latter, the network can be any type of network such as the Internet, a local area network (LAN), a wide area network (WAN), a virtual private network (VPN), etc. In any event, communication with infrastructure 502 could occur via a direct hardwired connection (e.g., serial port), or via an addressable connection that may utilize any combination of wired line and/or wireless transmission methods. Moreover, conventional network connectivity, such as Token Ring, Ethernet, Wi-Fi (Wireless Fidelity) or other conventional communications standards could be used. Still yet, connectivity could be provided by conventional TCP/IP sockets-based protocol. In this instance, the parties could utilize an Internet service provider to establish connectivity to infrastructure 502. It should be understood that under the present invention, infrastructure 502 could be owned and/or operated by a party such as a third party provider 550, or by an independent entity. Regardless, use of infrastructure 502 and the teachings described herein could be offered to the parties on a subscription or fee-basis. In either scenario, an administrator 534 could support and configure infrastructure 502, for instance, upgrading the Java IDE application 514 deployed on the computer system 504.

The computer system 504 is shown to include a CPU (hereinafter "processing unit 506"), a memory 512, a bus 510, and input/output (I/O) interfaces 508. Further, the computer system 504 is shown in communication with external I/O devices/resources 524 and storage system 522. In general, processing unit 506 executes computer program code, such as the Java integrated development environment (IDE) application 514 for guiding correction of semantic errors located within code being developed, using collaboration records 528. While executing computer program code, the processing unit 506 can read and/or write data to/from memory 512, storage system 522, and/or I/O interfaces 508. For instance, in one embodiment, the Java integrated development environment (IDE) application 514 stores collaboration records 528 within storage 522. Alternatively, the data stored in storage 522 may be stored in a separate storage within the system 504. Bus 510 provides a communication link between each of the components in computer system 500, such that information can be communicated within the infrastructure 502. External devices 524 can comprise any devices (e.g., keyboard, pointing device, display, etc.) that enable a user (developer or programmer) to interact with computer system 500 and/or any devices (e.g., network card, modem, etc.) that enable server 504 to communicate with one or more other computing devices.

Computer infrastructure 502 is only illustrative of various types of computer infrastructures for implementing the invention. For example, in an embodiment shown, computer infrastructure 502 comprises two or more computing devices (e.g., a server cluster) that communicate over a network to perform the various process steps of the invention. Moreover, computer system 500 is only representative of various possible computer systems that can include numerous combinations of hardware. To this extent, in other embodiments, computer system 500 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 506 may comprise a single processing unit, or be distributed across one or more processing units in one or more locations, e.g., on a client and server. Similarly, memory 512 and/or storage system 522 can comprise any combination of various types of data storage and/or transmission media that reside at one or more physical locations. Further, I/O interfaces 508 can comprise any system for exchanging information with one or more external devices 524. Still further, it is understood that one or more additional components (e.g., system software, math co-processing unit, etc.) not shown in FIG. 5 can be included in computer system 500. However, if computer system 500 comprises a handheld device or the like, it is understood that one or more external devices 524 (e.g., a display) and/or storage system(s) 522 could be contained within computer system 504, and not externally as shown. Storage system 522 can be any type of system (e.g., a database) capable of providing storage for information under the present invention, such as the collaboration records 528 stored in the collaboration datastore 526. To this extent, storage system 522 could include one or more storage devices, such as a magnetic disk drive or an optical disk drive. In another embodiment, storage system 522 includes data distributed across, for example, a local area network (LAN), wide area network (WAN) or a storage area network (SAN) (not shown). Although not shown, additional components, such as cache memory, communication systems, system software, etc., may be incorporated into computer system 500.

Accordingly, the invention provides a method for guiding correction of semantic errors by using collaboration records to identify semantic errors in the use of third-party libraries. When a semantic error pertaining to use of third party libraries is identified by the code editor, suggestions are offered to the application developer to correct the semantic error. In an embodiment, the suggestions offered for a semantic error are organized by libraries or by error condition, such that, the semantic error may be resolved in an efficient manner. Additionally, a developer can enter into discussion forums with peer developers regarding a particular suggestion offered for correcting a semantic error. Further, a developer can contribute new suggestions to the specific collaboration record for correcting the semantic error.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for guiding correction of semantic errors in code in an integrated development environment, said method comprising the steps of:

inputting, using a code editor, code being developed by a developer in an integrated development environment;

constructing, using a code parser, a syntax tree representation of said code inputted;

identifying, using one or more collaboration records located for a node in a syntax tree constructed for said code inputted, any semantic errors pertaining to use of a third-party library in said code inputted by said developer, wherein said one or more collaboration records contain suggestions offered by peer developers for correcting semantic errors related to a specific third-party library class;

organizing said suggestions into a group of suggestions for correcting semantic errors related to the third-party library;

displaying said code on a user interface;

displaying an error warning icon adjacent to any lines of said code that contain one or more of said semantic errors;

in response to receiving a signal indicating that a user has clicked a specific error warning icon, displaying one or more suggestions associated with said one or more collaboration records located to correct said any semantic errors identified for said node, wherein said one or more suggestions are retrieved from the group of suggestions for correcting semantic errors related to the third-party library, and wherein said developer can choose a suggestion of said one or more suggestions displayed to guide correction of said any semantic errors;

inquiring whether or not said developer wishes to add a new suggestion for handling a semantic error in a particular node in the syntax tree representation of said code inputted;

in response to determining that said developer does not wish to add said new suggestion for handling said semantic error in said particular node in the syntax tree representation of said code inputted, inquiring whether or not said developer wishes to contribute feedback with respect to said one or more suggestions displayed for said node; and in response to said developer sending a signal indicating a desire to contribute said feedback pertaining to said one or more suggestions displayed, receiving said feedback for updating said one or more suggestions displayed.

2. The method according to claim 1, further comprising:
providing a collaboration datastore for storing one or more collaboration records containing respective invocations for identifying said node, wherein a collaboration record includes one or more properties, and wherein a respective invocation of said respective invocations includes a type of invocation and one or more parameters.

3. The method of claim 2, further comprising:
identifying said any semantic errors by traversing said syntax tree representation of said code until a node containing a semantic error is found.

4. The method according to claim 1, further comprising:
establishing a separate collaboration record for each of said semantic errors related to said specific third-party library class.

5. The method according to claim 1, further comprising:
ascertaining whether or not said developer wishes to apply a suggestion of said one or more suggestions displayed for a particular node in said syntax tree representation of said code inputted; and in response to said developer sending a signal indicating a desire to apply said suggestion of said one or more suggestions displayed for said node, applying said suggestion to said node to guide correction of said any semantic errors identified.

6. The method according to claim 1, further comprising:
in response to determining that no suggestions have been made by the peer developers regarding a semantic error in a particular node in the syntax tree representation of said code inputted, inquiring whether or not said developer wishes to add a new suggestion to a respective invocation within a collaboration record of said one or more collaboration records located; and in response to said developer sending a message indicating a desire to add said new suggestion to said respective invocation within said collaboration record of said one or more collaboration records located, receiving said new suggestion for updating said respective invocation associated with said collaboration record of said one or more collaboration records located.

7. A computer system for guiding correction of semantic errors in code in an integrated development environment, said computer system comprising:
a central processing unit;
first program instructions to input code being developed by a developer in an integrated development environment, said first program instructions including instructions to construct, using a code parser, a syntax tree representation of said code inputted;
second program instructions to identify, using one or more matching collaboration records located for a node in a syntax tree constructed for said code inputted, any semantic errors pertaining to use of a third-party library in said code inputted, wherein said one or more matching collaboration records contain suggestions offered by peer developers for correcting semantic errors related to a specific third-party library class;
third program instructions to organize said suggestions into a group of suggestions for correcting semantic errors related to the third-party library;
fourth program instructions to display said code on a user interface;
fifth program instructions to display an error warning icon adjacent to any lines of said code that contain one or more of said semantic errors;
sixth program instructions to, in response to receiving a signal indicating that a user has clicked a specific error warning icon, display one or more suggestions associated with said one or more collaboration records located to correct said any semantic errors identified for said node, wherein said one or more suggestions are retrieved from the group of suggestions for correcting semantic errors related to the third-party library, and wherein said developer can choose a suggestion of said one or more suggestions displayed to guide correction of said any semantic errors;
seventh program instructions to inquire whether or not said developer wishes to add a new suggestion for handling a semantic error in a particular node in the syntax tree representation of said code inputted;
eighth program instructions to, in response to determining that said developer does not wish to add said new suggestion for handling said semantic error in said particular node in the syntax tree representation of said code inputted, inquire whether or not said developer wishes to contribute feedback with respect to said one or more suggestions displayed for said node; and
ninth program instructions to, if said developer wishes to contribute said feedback pertaining to said one or more suggestions displayed, receive said feedback for updating said one or more suggestions displayed, and wherein said first, second, third, fourth, fifth, sixth, seventh, eighth, and ninth program instructions are stored in said computer system for execution by said central processing unit.

8. The computer system according to claim 7, further comprising instructions to provide a collaboration datastore for storing one or more collaboration records containing respective invocations for identifying said node, wherein a collaboration record includes one or more properties, and wherein a respective invocation of said respective invocations includes a type of invocation and one or more parameters.

9. The computer system according to claim 8, further comprising instructions to create semantic error markers within a code editor for said any semantic errors identified using said one or more collaboration records located.

10. The computer system according to claim 9, further comprising instructions to ascertain whether or not said developer wishes to apply a suggestion of said one or more suggestions displayed for said node, and if said developer wishes to apply said suggestion of said one or more suggestions displayed for said node, said third instructions include instructions to apply said suggestion to said node to guide correction of said any semantic errors identified.

11. The computer system according to claim 10, further comprising instructions to inquire whether or not said developer wishes to contribute feedback with respect to said one or more suggestions displayed for said node, and if said developer wishes to contribute said feedback pertaining to said one or more suggestions displayed for said node, receiving said feedback for updating said one or more suggestions displayed for said node.

12. The computer system according to claim 10, further comprising instructions to inquire whether or not said developer wishes to add a new suggestion to a respective invocation within a collaboration record of said one or more collaboration records located, and if said developer wishes to add said new suggestion to said respective invocation within said collaboration record of said one or more collaboration records located, receiving said new suggestion for updating said respective invocation associated with said collaboration record of said one or more collaboration records located.

13. A computer program product for guiding correction of semantic errors in code in an integrated development environment, said computer program product comprising:

A non-transitory computer readable medium;

first program instructions to input code being developed by a developer in an integrated development environment, said first program instructions including instructions to construct, using a code parser, a syntax tree representation of said code inputted;

second program instructions to identify, using one or more matching collaboration records located for a node in a syntax tree constructed for said code inputted, any semantic errors pertaining to use of a third-party library in said code inputted, wherein said one or more matching collaboration records contain suggestions offered by peer developers for correcting said any semantic errors related to a specific third-party library class;

third program instructions to organize said suggestions into a group of suggestions for correcting semantic errors related to the third-party library;

fourth program instructions to display said code on a user interface;

fifth program instructions to display an error warning icon adjacent to any lines of said code that contain one or more of said semantic errors;

sixth program instructions to, in response to receiving a signal indicating that a user has clicked a specific error warning icon, display one or more suggestions associated with said one or more collaboration records located to correct said any semantic errors identified for said node, wherein said one or more suggestions are retrieved from the group of suggestions for correcting semantic errors related to the third-party library, and wherein said developer can choose a suggestion of said one or more suggestions displayed to guide correction of said any semantic errors;

seventh program instructions to, in response to determining that no suggestions have been made by the peer developers regarding a semantic error in a particular node in the syntax tree representation of said code inputted, inquire whether or not said developer wishes to add a new suggestion to a respective invocation within a collaboration record of said one or more collaboration records located; and eighth program instructions to, if said developer wishes to add said new suggestion to said respective invocation within said collaboration record of said one or more collaboration records located, receive said new suggestion for updating said respective invocation associated with said collaboration record of said one or more collaboration records located; and wherein said first, second, third, fourth, fifth, sixth, seventh, and eighth program instructions are recorded on said non-transitory computer readable medium.

14. The computer program product according to claim 13, further comprising:

ninth program instructions to ascertain whether or not said developer wishes to apply a suggestion of said one or more suggestions displayed for said node, and if said developer wishes to apply said suggestion of said one or more suggestions displayed for said node, said ninth program instructions including instructions to apply said suggestion to said node to guide correction of said any semantic errors identified before executing said code, and wherein said ninth program instructions are recorded on said computer readable medium.

15. The computer program product according to claim 14, further comprising:

tenth program instructions to provide a collaboration datastore for storing one or more collaboration records containing respective invocations for identifying said node, wherein a collaboration record includes one or more properties, wherein a respective invocation of said respective invocations includes a type of invocation and one or more parameters, and wherein said second program instructions include instructions to create semantic error markers within a code editor for said any semantic errors identified using said one or more matching collaboration records located, and wherein said tenth program instructions are recorded on said computer readable medium.

16. The computer program product according to claim 15, further comprising:

eleventh program instructions to ascertain whether or not said developer wishes to apply a suggestion of said one or more suggestions displayed for said node; and twelfth program instructions to, in response to receiving a signal from said developer indicating a desire to apply said suggestion of said one or more suggestions displayed for said node, apply said suggestion to said node to guide correction of said any semantic errors identified, and wherein said eleventh and twelfth program instructions are recorded on said computer readable medium.

17. The computer program product according to claim 16, further comprising:

thirteenth program instructions to inquire whether or not said developer wishes to contribute feedback with respect to said one or more suggestions displayed for said node, and in response to receiving a signal from said developer indicating a desire to contribute said feedback pertaining to said one or more suggestions displayed for said node, receiving said feedback for updating said one or more suggestions displayed for said node, and wherein said thirteenth program instructions are recorded on said computer readable medium.

\* \* \* \* \*